United States Patent
Pausch et al.

(10) Patent No.: US 7,841,622 B2
(45) Date of Patent: Nov. 30, 2010

(54) AIRBAG AND AIRBAG APPARATUS

(75) Inventors: Tobias Pausch, Tokyo (JP); Masahiro Hasebe, Tokyo (JP); Kei Tsujimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 256 days.

(21) Appl. No.: 12/091,533

(22) PCT Filed: Nov. 8, 2006

(86) PCT No.: PCT/JP2006/322260
§ 371 (c)(1),
(2), (4) Date: Apr. 25, 2008

(87) PCT Pub. No.: WO2007/055234
PCT Pub. Date: May 18, 2007

(65) Prior Publication Data
US 2009/0115177 A1    May 7, 2009

(30) Foreign Application Priority Data
Nov. 10, 2005  (JP)  ............................. 2005-326324
Dec. 21, 2005  (JP)  ............................. 2005-368280

(51) Int. Cl.
*B60R 21/16* (2006.01)
(52) U.S. Cl. .................................... 280/743.2; 280/729
(58) Field of Classification Search .............. 280/743.2, 280/743.1, 729
See application file for complete search history.

(56) References Cited

U.S. PATENT DOCUMENTS 6,540,254 B2    4/2003    Bieber et al.

(Continued)

FOREIGN PATENT DOCUMENTS

JP    49-23176    6/1974

(Continued)

OTHER PUBLICATIONS

An International Search Report dated Feb. 13, 2007, from the International Bureau in corresponding International (PCT) Application No. PCT/JP2006/322260.

*Primary Examiner*—Ruth Ilan
(74) *Attorney, Agent, or Firm*—Fitch, Even, Tabin & Flannery

(57) ABSTRACT

The area of panels used in an airbag that inflates so that a recess extends in the vertical direction between a left chamber and a right chamber. The airbag 1 includes a front chamber 2 positioned in the forefront when viewed from the position of an occupant, the left chamber 3 communicating with the front chamber 2 to be inflated on the left side in front of the occupant, and the right chamber 4 communicating with the front chamber 2 to be inflated on the right side in front of the occupant. In a state in which the airbag 1 is inflated, there is no extending member such as a tie panel between the distal parts of the left chamber 3 and the right chamber 4, and a recess 6 formed between the distal parts of the left chamber 3 and the right chamber 4 opens toward the occupant, and continuously extends from the upper part of the airbag 1 to the lower part thereof. A tether belt 7 extends between the upper part of the deepest part of the recess 6, and the bottom part of the airbag 1 so that the upper part of the recess 6 is pulled to the inside of the airbag 1.

3 Claims, 6 Drawing Sheets

U.S. PATENT DOCUMENTS

| | | |
|---|---|---|
| 6,802,534 B2 | 10/2004 | Neupert |
| 6,969,086 B2 | 11/2005 | Hasebe et al. |
| 7,000,943 B2 | 2/2006 | Hasebe et al. |
| 7,093,853 B2 | 8/2006 | Hasebe et al. |
| 7,152,880 B1* | 12/2006 | Pang et al. ............... 280/743.2 |
| 2004/0070187 A1* | 4/2004 | Chen ......................... 280/742 |
| 2004/0145161 A1 | 7/2004 | Hasebe et al. |
| 2004/0155440 A1 | 8/2004 | Hasebe et al. |
| 2004/0195807 A1* | 10/2004 | Hasebe et al. ........... 280/728.1 |
| 2005/0098994 A1* | 5/2005 | Matsumura .............. 280/743.1 |
| 2005/0104351 A1 | 5/2005 | Lorezn |
| 2006/0049618 A1* | 3/2006 | Bito .......................... 280/732 |
| 2006/0186656 A1* | 8/2006 | Kumagai ................. 280/743.2 |

FOREIGN PATENT DOCUMENTS

| | | |
|---|---|---|
| JP | 10-71911 | 3/1998 |
| JP | 2004-244006 | 9/2004 |
| JP | 2004-314933 | 11/2004 |
| JP | 2005-162195 | 6/2005 |
| JP | 2005-212508 | 8/2005 |

\* cited by examiner

AIRBAG AND AIRBAG APPARATUS

TECHNICAL FIELD

The present invention relates to airbags and airbag apparatuses for protecting occupants in case of a vehicle collision or the like, and more specifically, relates to an air bag which includes left and right chambers inflating on the left and right sides in front of an occupant, respectively, and in which a recess is formed in the vertical direction between the left and right chambers, and an airbag apparatus provided with the airbag.

BACKGROUND ART

As an example of an airbag for protecting an occupant in case of a vehicle collision or the like, Japanese Unexamined Patent Application Publication No. 2004-244006 discloses an airbag having a left airbag section and a right airbag section which are inflated on the left side and the right side in front of the occupant, respectively, and adapted to be inflated by a common inflator.

The airbag is folded and stored in a case, and covered by a lid or an instrument panel. When the inflator (gas generator) is activated to jet gas upon vehicle collision, the airbag pushes and opens the lid or the instrument panel and is inflated in front of the occupant.

On the surface of the inflated airbag facing the occupant, a recess extends between a left chamber and a right chamber, from the upper surface of the airbag to the lower surface of the airbag.

Patent Document 1: Japanese Unexamined Patent Application Publication No. 2004-244006

In the airbag disclosed in the above-described Japanese Unexamined Patent Application Publication No. 2004-244006, since the recess has a depth of about 280 to 480 mm, the surface area of the airbag is large. Therefore, a panel having a large area (a large amount of cloth) is necessary for forming the airbag and the material cost is increased.

DISCLOSURE OF INVENTION

Accordingly, an object of the present invention is to reduce the amount of panels to be used in an airbag that inflates so that a recess extends in the vertical direction between a left chamber and a right chamber.

An airbag according to a first aspect includes a front chamber to which gas is supplied from an inflator, and left and right chambers communicating with the front chamber, and receiving gas from the front chamber, to be inflated on left and right sides in front of an occupant, respectively. In a state in which the airbag is inflated, a recess is provided that continuously extends from an upper surface of the airbag to a lower surface of the airbag between the left and right chambers. In the airbag, a tether belt is provided in the airbag for pulling at least one part of the deepest part of the recess to the inside of the airbag.

The tether belt may extend to a substantially intermediate part in a vertical direction, or an upper part of the deepest part of the recess.

The depth of the recess in a horizontal cross section passing through a side nearest to the occupant of the inflated airbag may be in the range of 10 to 280 mm.

According to a second aspect, an airbag apparatus includes the airbag according to the first aspect, and an inflator for inflating the airbag.

BRIEF DESCRIPTION OF THE DRAWINGS

FIG. 6b is a cross sectional view taken along the line VIb-VIb of FIG. 6a.

BEST MODE FOR CARRYING OUT THE INVENTION

According to the present invention, the left chamber of the inflated airbag receives the left chest of the occupant, and the right chamber receives the right chest of the occupant. The recess of the inflated airbag is made to face the lateral center of the chest, and the head of the occupant.

According to the present invention, since at least one part of the recess between the left and right chambers is pulled to the inside of the airbag with the tether belt, even when the panels are designed so that the recess is shallow, the recess can be made deep.

According to the present invention, the surface area of the airbag is reduced by making the recess shallow, and thus the total area of the panels required can be reduced.

The upper part or the substantially intermediate part of the recess is pulled to the inside of the airbag, thereby increasing the depth of the recess facing the head or the center of the chest of the occupant.

According to the present invention, the depth of the recess in a horizontal cross section of the inflated airbag passing through the side nearest to the occupant is preferably in the range of 10 to 280 mm, more preferably, 50 to 200 mm.

Embodiments of the present invention will be described below with reference to the drawings.

Figure 1:
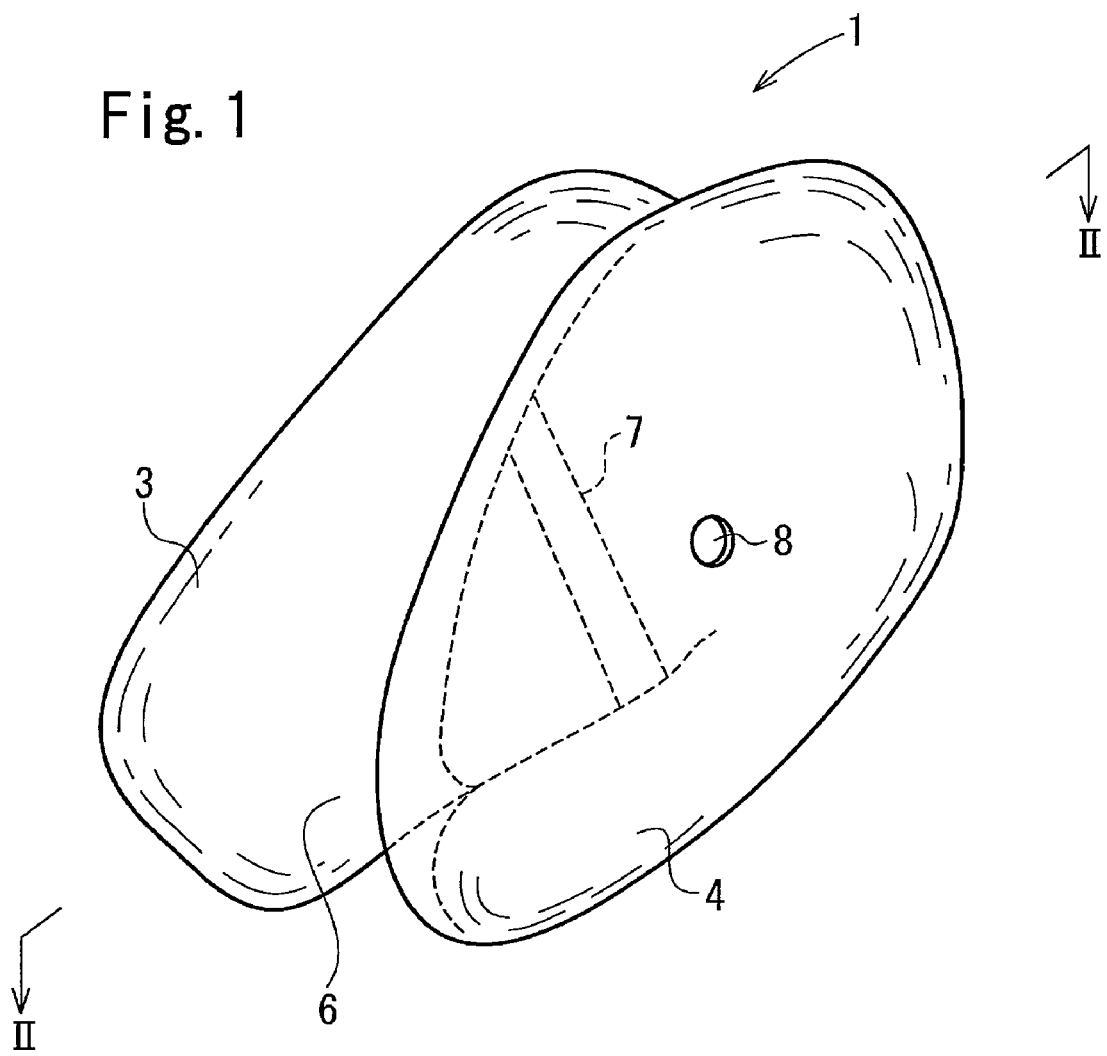
FIG. 1 is a perspective view of a passenger airbag according to an embodiment of the present invention, showing an inflated state.
Figure 2:
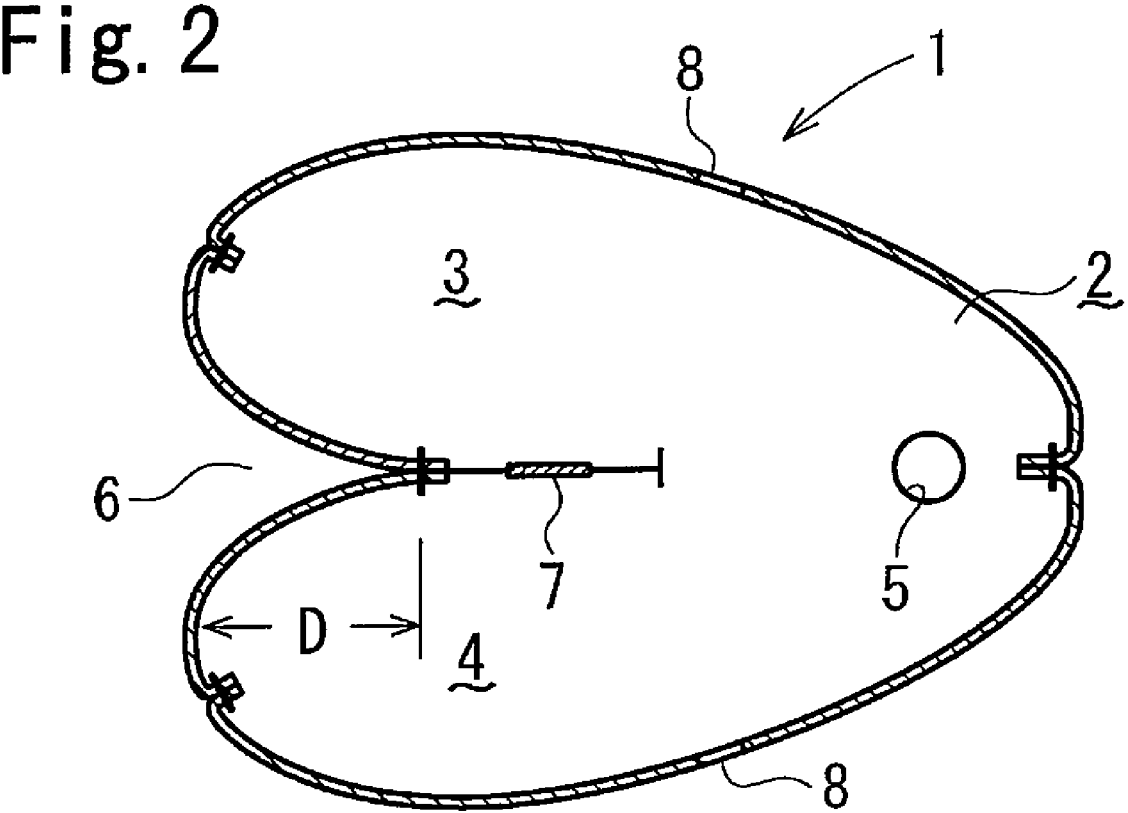
FIG. 2 is a cross sectional view taken along the line II-II of FIG. 1.
Figure 3:
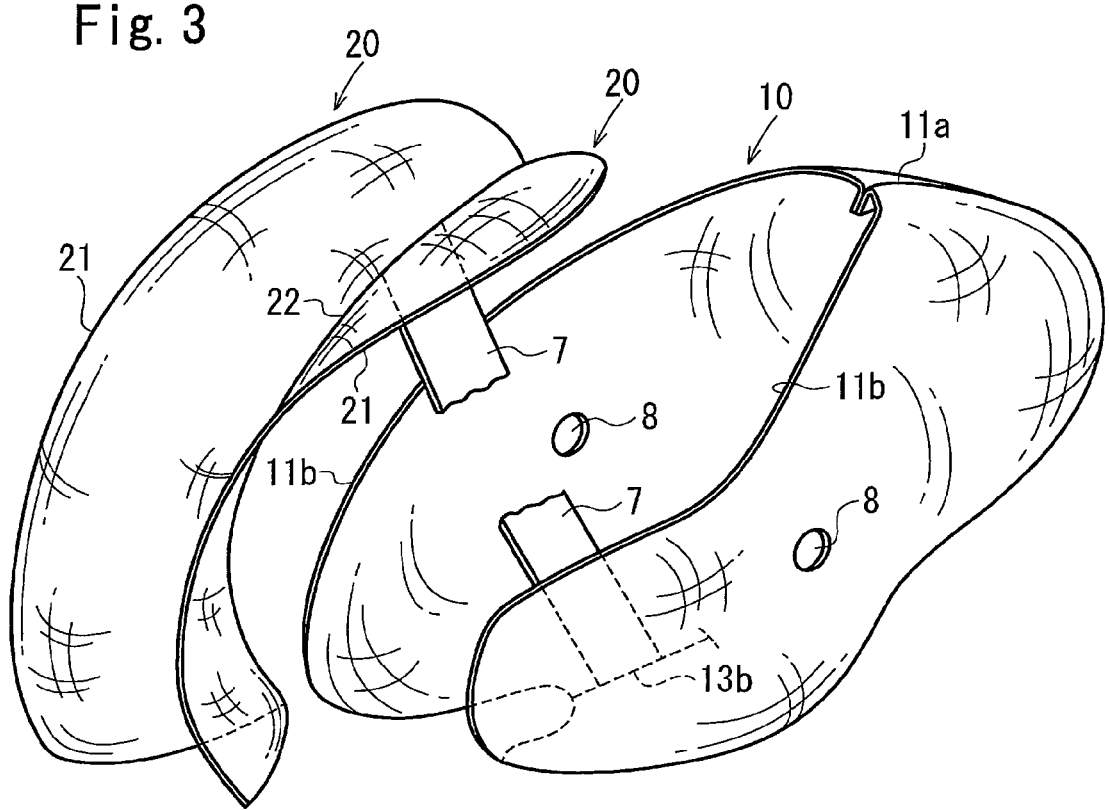
FIG. 3 is an exploded perspective view of the airbag in FIG. 1.
Figure 4:
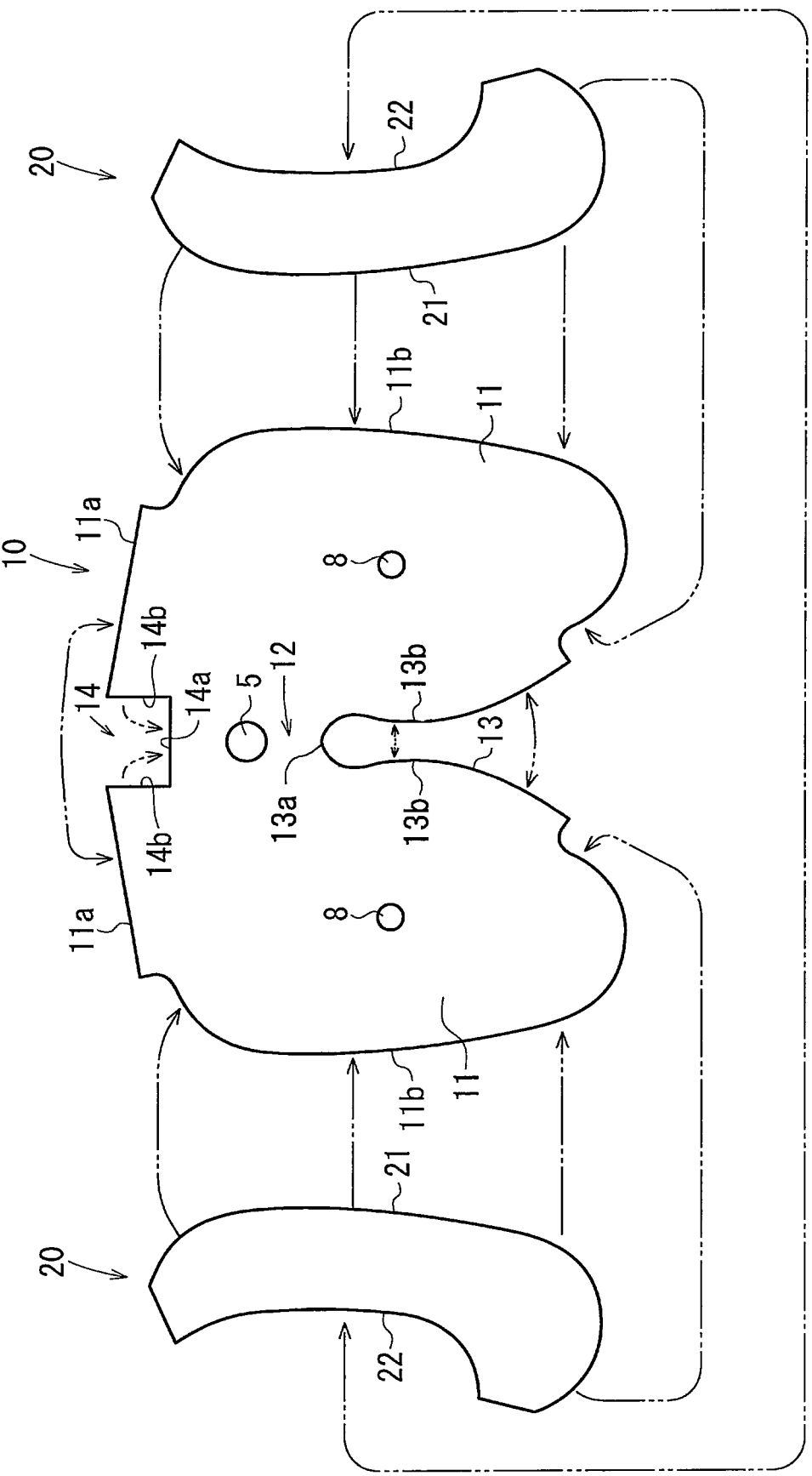
FIG. 4 is a plan view of panels forming the airbag in FIG. 1.

FIG. 1 is a perspective view of a passenger airbag according to an embodiment of the present invention, showing an inflated state; FIG. 2 is a cross sectional view taken along the line II-II of FIG. 1; FIG. 3 is an exploded perspective view of the airbag; and FIG. 4 is a plan view of panels forming the airbag.

An airbag 1 includes a front chamber 2 positioned in the forefront when viewed from the position of an occupant, a left chamber 3 communicating with the front chamber 2 to be inflated on the left side in front of the occupant, and a right chamber 4 communicating with the front chamber 2 to be inflated on the right side in front of the occupant. An inflator mounting port 5 is provided on the bottom surface part of the front chamber 2.

As shown in FIG. 1, in a state in which the airbag 1 is inflated, there is no extending member such as a tie panel between the distal parts of the left chamber 3 and the right chamber 4, and a recess 6 formed between the distal parts of the left chamber 3 and the right chamber 4 opens toward the occupant, and continuously extends from the upper part of the airbag 1 to the lower part thereof. The deepest part of the recess 6 is curved so as to protrude toward the occupant in a substantially intermediate part of the deepest part in the vertical direction.

A tether belt 7 extends between the upper part of the deepest part of the recess 6 and the bottom part of the airbag 1 so that the upper part of the recess 6 is pulled to the inside of the airbag 1. The left chamber 3 and the right chamber 4 communicate with the outside of the airbag 1 through vent holes 8.

The airbag 1 is provided with a main panel 10, and two inside panels 20, as shown in FIGS. 3 and 4.

As shown in FIG. 4, the main panel 10 has right and left half parts 11 communicating with each other through a front chamber bottom part 12. While an approximately U-shaped curved part 13 notched from the occupant side is formed on the occupant side of the main panel 10, a rectangular notch part 14 is formed on the side opposite the occupant side.

A depth side part 14a, and right and left side parts 14b of the notch part 14 are sewed together. When one of the half parts 11 is sewed to the other half part 11 at edge sides 11a adjacent to the front chamber 2 of the respective half parts, the main panel 10 is formed into a half-opened shell shape, thereby forming outward surfaces of the left chamber 3 and the right chamber 4 of the airbag 1, and an outer surface of the front chamber 2.

Each of the inside panels 20 has a substantially arched shape having a long-arc side 21 and a short-arc side 22. The long-arc sides 21 of the respective inside panels 20 are sewed to outer edge sides 11b of the respective half parts 11, and the short-arc sides 22 of the respective inside panels 20 are sewed to each other, thereby forming the surfaces of the airbag 1 facing the occupant. The curved part 13 of the main panel 10 has a deepest part 13a and a pair of side parts 13b communicating with the deepest part 13. The side parts 13b are sewed to each other.

As shown in FIG. 3, the tether belt 7 has one end sewed to the stitches between the short-arc sides 22 on the upper parts of the inside panels 20, and the other end sewed to the side parts 13b near the deepest part 13a of the curved part 13. Accordingly, the other end of the tether belt 7 extends to a center part in a horizontal direction of the bottom part of the air bag 1.

An airbag apparatus includes the airbag 1, an inflator for inflating the airbag 1, a case for storing the airbag 1, and a lid or an instrument panel for covering the case. The airbag apparatus is mounted in an automobile so that the airbag is positioned on the behind side of the instrument panel.

The inflator is activated, thereby inflating the airbag 1, as shown in FIG. 1. The left chamber 3 receives the left chest of the occupant, and the right chamber 4 receives the right chest of the occupant. The head of the occupant is received so as to be taken into the recess 6.

In a state in which the airbag 1 is inflated, the depth (substantially corresponding to D in FIG. 2) of the recess 6 in a horizontal cross section including the tip end part nearest to the occupant is preferably in the range of about 10 to 280 mm, more preferably, about 50 to 200 mm.

Since the airbag 1 has the recess 6 that is relatively shallow, the surface area of the airbag 1 is small, and the total area of the panels 10, 20 is small. Therefore, the material cost of the panels is reduced, and a relatively short sewing length is sufficient. In the airbag 1, the recess 6 is shallow, however, the upper part of the recess 6 is pulled to the inside of the airbag 1 with the tether belt 7, and has a shape suitable for receiving the head of the occupant.

In the foregoing embodiment, the upper part of the deepest part of the recess 6 (the stitches between the short-arc sides 22 of the inside panels 20) is pulled to the inside of the airbag 1 with the tether belt 7. However, the connection position of the tether belt 7 may be changed so that the substantially intermediate part in the vertical direction, or the bottom part of the recess 6 is pulled to the inside of the airbag 1 (for example, the other end of the tether belt 7 may be connected to the vicinity of the inflator mounting port 5). Alternatively, a plurality of parts in the vertical direction of the recess 6 may be pulled to the inside of the airbag 1 by way of the tether belt.

Figure 5:
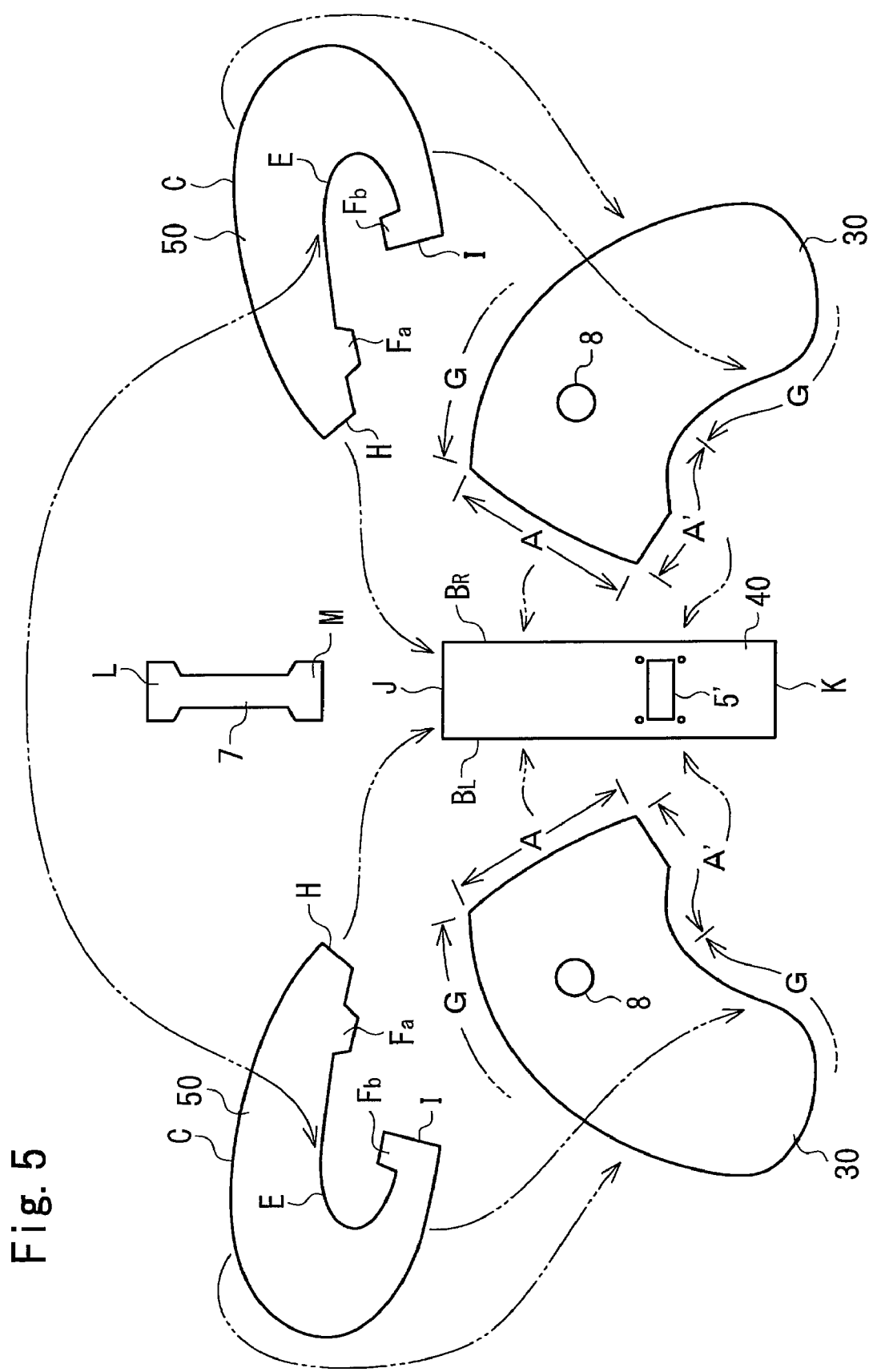
FIG. 5 is a plan view of panels forming an airbag according to another embodiment of the present invention.
Figure 6A:
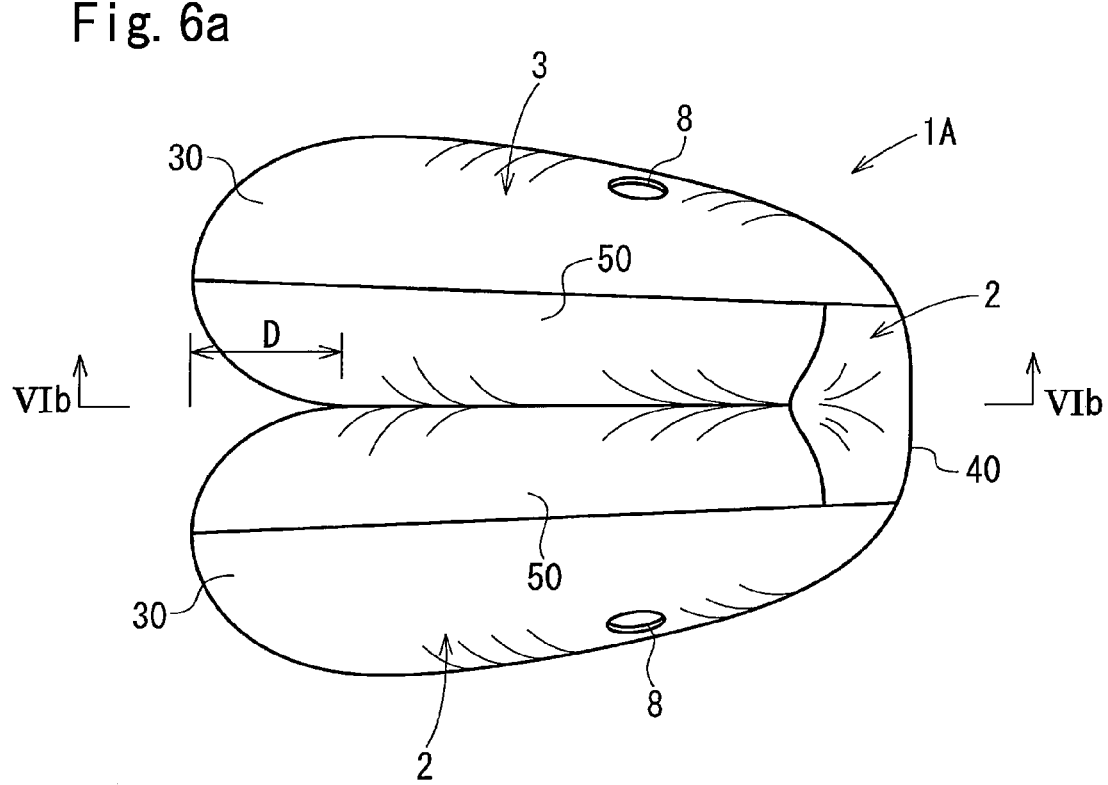
FIG. 6a is a top view of the airbag in FIG. 5.
Figure 6B:
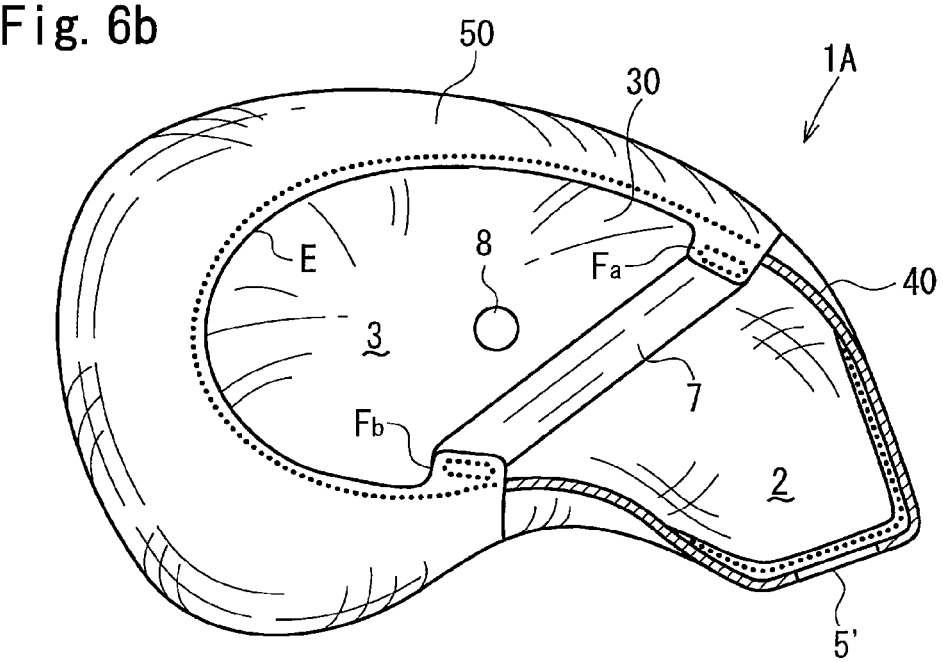

FIG. 5 is a plan view of panels forming an airbag according to another embodiment of the present invention; FIG. 6a is a top view of the airbag; and FIG. 6b is a cross sectional view taken along the line VIb-VIb of FIG. 6a.

In the foregoing embodiment, the outward surfaces of the left chamber 3 and the right chamber 4, and the outer surface of the front chamber 2 of the airbag 1 are composed of one main panel 10, whereas, in an airbag 1A according to the present embodiment, they are composed of separate panels.

The configurations of the panels for the airbag 1A will be described below.

The airbag 1A is provided with two outer panels 30, one center panel 40, two inside panels 50, and one tether belt 7.

The respective outer panels 30 substantially correspond to the right and left half parts 11 of the main panel 10 according to the foregoing embodiment. The center panel 40 substantially corresponds to the front chamber bottom part 12. The center panel 40 is provided with an inflator mounting port 5' to be positioned on the bottom surface part of the front chamber 2 of the airbag 1A after sewing.

The peripheral edges of the regions of the respective outer panels 30 forming the right and left side surfaces of the front chamber 2 (from the side A to the side A' as shown in FIG. 5) are sewed to the right and left sides $B_R$, $B_L$ of the center panel 40, respectively. Thus, the panels 30, 40 form a continuous body in a half-opened shell shape, like the main panel 10 shown in FIG. 3, thereby forming the outward surfaces of the left chamber 3 and the right chamber 4 of the airbag 1A, and the outer surface of the front chamber 2.

Each of the inside panels 50 has a substantially arched shape having a long-arc side C and a short-arc side E, in a manner similar to the inside panels 20 according to the foregoing embodiment. Tab-shaped mounting pieces Fa, Fb for respectively mounting one end and the other end of the tether belt 7 are provided at one end and the other end of the short-arc side E.

The long-arc sides C of the respective inside panels 50 are sewed to the outer edge sides G of the respective outer panels 30, and the short-arc sides E of the respective inside panels 50 are sewed to each other. Also, the upper end sides H of the respective inside panels 50 are sewed to the upper end side J of the center panel 40, and the lower end sides I of the respective inside panels 50 are sewed to the lower end side K of the center panel 40, thereby forming the surfaces of the airbag 1A facing the occupant. The surfaces facing the occupant form the recess 6 opening toward the occupant, as shown in FIG. 6a.

As shown in FIG. 6b, one end of the tether belt 7 (the end part L in FIG. 5) is sewed to the mounting pieces Fa at the upper ends of the respective inside panels 50 and the other end of the tether belt 7 (the end part M in FIG. 5) is sewed to the mounting pieces Fb at the lower ends of the respective inside panels 50. The mounting pieces Fa at the upper ends of the respective inside panels 50 are positioned deeper, namely, farther from the occupant than the mounting pieces Fb at the lower ends in the front chamber 2. Accordingly, the lower end parts of the respective inside panels 50 (the deepest part at the lower end of the recess 6) are pulled toward the deeper side of the front chamber 2, namely, toward the side opposite to the occupant, by way of the tether belt 7.

The airbag 1A is also configured so that in the inflated state of the airbag 1A, the depth (substantially corresponding to D shown in FIG. 6*a*) of the recess 6 in a horizontal cross section including the tip end part nearest to the occupant is in the range of about 10 to 280 mm, more preferably, about 50 to 200 mm.

The configurations of the airbag 1A and an airbag apparatus provided with the airbag 1A are similar to those in the foregoing embodiment, except for the above-described configurations. In FIGS. 5, 6*a* and 6*b*, like reference numerals are used to designate parts similar to those in FIGS. 1 to 4.

The airbag 1A has advantages similar to those of the airbag 1 according to the foregoing embodiment.

In the present embodiment, since the panels forming the airbag 1A are relatively small, the panels can be efficiently made from a single sheet of ground fabric by efficiently laying out the panels, thereby further reducing the material cost of the airbag 1A.

The above-described embodiments are shown as examples of the present invention, and the present invention may take embodiments other than those shown in the drawings.

For example, a laterally extending tether belt may be provided for regulating the width of the inflated airbag 1 or 1A in the left-right direction.

The configurations of the panels for the airbag according to the present invention are not limited to those given in the above-described embodiments.

This application claims the benefit of Japanese Patent Application (No. 2005-326324) filed Nov. 10, 2005, and Japanese Patent Application (No. 2005-368280) filed Dec. 21, 2005, which are hereby incorporated by reference herein in their entirety.

The invention claimed is:

1. An airbag comprising:
   a front chamber to which gas is supplied with the front chamber having a front end thereof; and
   left and right spaced chambers communicating with the front chamber, and receiving gas from the front chamber, to be inflated on left and right sides in front of an occupant, respectively, the left chamber having a distal rear end and the right chamber having a distal rear end with the distal rear ends being spaced from each other when the airbag is inflated,
   wherein, in a state in which the airbag is inflated, a central recess is provided extending forwardly from between the spaced distal rear ends of the left and right chambers toward the front chamber to a forward edge of the recess with the left and right chambers being completely spaced from each other across the recess from the recess forward edge to the spaced rear distal ends thereof without any connecting members extending across the recess between the chambers, the central recess continuously vertically extending from an upper surface of the airbag to a lower surface of the airbag between the left and right chambers,
   wherein a tether belt is provided in the airbag for pulling at least one part of the deepest part of the recess to the inside of the airbag, and
   wherein the tether belt has opposite ends that are both directly connected to the airbag including an upper end connected at the recess forward edge and a lower end connected at or slightly forwardly of the recess forward edge spaced rearwardly from the front end of the front chamber, with one of the upper and lower ends of the tether being rearward of the other of the tether ends.

2. The airbag according to claim 1, wherein, in the state in which the airbag is inflated, the depth of the recess in a horizontal cross section passing through a side nearest to the occupant is in the range of 10 to 280 mm.

3. An airbag apparatus comprising:
   the airbag according to claim 1; and
   an inflator for inflating the airbag.

* * * * *